(12) United States Patent
Steinberg et al.

(10) Patent No.: US 6,966,015 B2
(45) Date of Patent: Nov. 15, 2005

(54) METHOD AND SYSTEM FOR REDUCING FALSE ALARMS IN NETWORK FAULT MANAGEMENT SYSTEMS

(75) Inventors: Louis A. Steinberg, New Fairfield, CT (US); Evan R. Wetstone, Dunwoody, GA (US); Arkadiy Belousov, Stamford, CT (US); John Deuel, Ossining, NY (US)

(73) Assignee: Micromuse, Ltd., London (GB)

( * ) Notice: Subject to any disclaimer, the term of this patent is extended or adjusted under 35 U.S.C. 154(b) by 608 days.

(21) Appl. No.: 09/815,557

(22) Filed: Mar. 22, 2001

(65) Prior Publication Data

US 2002/0170002 A1 Nov. 14, 2002

(51) Int. Cl.[7] .............................................. G06F 11/00
(52) U.S. Cl. ............................................ 714/47; 714/26
(58) Field of Search ........................................ 714/47, 26

(56) References Cited

U.S. PATENT DOCUMENTS

| | | | |
|---|---|---|---|
| 4,634,110 A | 1/1987 | Julich et al. | |
| 5,293,323 A | 3/1994 | Doskocil et al. | 364/551.01 |
| 5,325,518 A | 6/1994 | Bianchini, Jr. | |
| 5,383,178 A | 1/1995 | Unverrich | |
| 5,528,516 A | 6/1996 | Yemini et al. | |
| 5,557,747 A | 9/1996 | Rogers et al. | |
| 5,646,864 A | 7/1997 | Whitney | |
| 5,661,668 A | 8/1997 | Yemini et al. | |
| 5,748,098 A | 5/1998 | Grace | |
| 5,761,502 A | 6/1998 | Jacobs | |
| 5,774,377 A | 6/1998 | Eidson et al. | |
| 5,819,028 A | 10/1998 | Manghirmalani et al. | |
| 5,832,196 A | 11/1998 | Croslin et al. | |
| 5,872,911 A | 2/1999 | Berg | |
| 5,946,373 A * | 8/1999 | Harris | 379/14.01 |
| 5,949,759 A | 9/1999 | Cretegny et al. | |
| 5,984,178 A | 11/1999 | Gill et al. | |
| 6,006,016 A | 12/1999 | Faigon et al. | |
| 6,012,152 A | 1/2000 | Douik et al. | |
| 6,047,279 A | 4/2000 | Barrack et al. | |
| 6,049,792 A | 4/2000 | Hart et al. | |
| 6,118,936 A | 9/2000 | Lauer et al. | |
| 6,239,699 B1 * | 5/2001 | Ronnen | 340/517 |
| 6,253,339 B1 * | 6/2001 | Tse et al. | 714/47 |
| 6,360,335 B1 | 3/2002 | Dawson | 714/39 |

* cited by examiner

Primary Examiner—Scott Baderman
Assistant Examiner—Joshua Lohn
(74) Attorney, Agent, or Firm—Brown Raysman Millstein Felder & Steiner LLP

(57) ABSTRACT

Methods and systems are described for reducing the number of false alarms in fault correlation software used to detect and diagnose faults in computer networks and similar systems. The fault correlation software includes rules that monitor a number of indicators that, if occurring together over a window of time, are known to cause or reflect the occurrence of a fault. The method involves monitoring the transition of these indicators from one state to another over the time window and determining the extent of the correlation of the transitions of the indicators. The determination that indicators monitored by a rule do not correlate closely in their transitions is used to reduce the likelihood of the rule finding correlation of the indicators as a whole. This in turn reduces the number of false alarms which the rule-based system might otherwise have transmitted.

59 Claims, 8 Drawing Sheets

|          | 0   | 1 | 2 | 3 | 4 | 5 | 6 | 7 | 8 | 9 | 10 |
|----------|-----|---|---|---|---|---|---|---|---|---|----|
| Object 1 | 1   | 1 | 1 | 1 | 1 | 1 | 1 | 1 | 1 | 1 | 1  |
| Object 2 | 1   | 1 | 1 | 1 | 1 | 1 | 1 | 1 | 1 | 1 | 1  |
| Object 3 | 1   | 1 | 1 | 1 | 1 | 1 | 1 | 1 | 1 | 1 | 1  |
|          |     |   |   |   |   |   |   |   |   |   |    |
| cf       |     | 1 | 1 | 1 | 1 | 1 | 1 | 1 | 1 | 1 | 1  |
| newcf    |     | 1 | 1 | 1 | 1 | 1 | 1 | 1 | 1 | 1 | 1  |
| meancf   | 100 |   |   |   |   |   |   |   |   |   |    |
| newmeancf| 100 |   |   |   |   |   |   |   |   |   |    |

FIG. 6

|          | 0  | 1 | 2 | 3 | 4 | 5 | 6 | 7 | 8 | 9 | 10 |
|----------|----|---|---|---|---|---|---|---|---|---|----|
| Object 1 | 0  | 0 | 1 | 1 | 1 | 0 | 1 | 1 | 0 | 1 | 1  |
| Object 2 | 0  | 0 | 1 | 1 | 1 | 0 | 1 | 1 | 0 | 1 | 1  |
| Object 3 | 0  | 0 | 1 | 1 | 1 | 0 | 1 | 1 | 0 | 1 | 1  |
|          |    |   |   |   |   |   |   |   |   |   |    |
| cf       |    | 0 | 1 | 1 | 1 | 0 | 1 | 1 | 0 | 1 | 1  |
| newcf    |    | 0 | 1 | 1 | 1 | 0 | 1 | 1 | 0 | 1 | 1  |
| meancf   | 70 |   |   |   |   |   |   |   |   |   |    |
| newmeancf| 70 |   |   |   |   |   |   |   |   |   |    |

FIG. 7

|          | 0      | 1 | 2 | 3    | 4    | 5    | 6 | 7    | 8    | 9    | 10   |
|----------|--------|---|---|------|------|------|---|------|------|------|------|
| Object 1 | 1      | 1 | 1 | 0    | 0    | 1    | 1 | 1    | 1    | 1    | 1    |
| Object 2 | 1      | 1 | 1 | 1    | 1    | 1    | 1 | 0    | 0    | 0    | 1    |
| Object 3 | 1      | 1 | 1 | 1    | 1    | 1    | 1 | 0    | 0    | 0    | 1    |
|          |        |   |   |      |      |      |   |      |      |      |      |
| cf       |        | 1 | 1 | .667 | .667 | 1    | 1 | .333 | .333 | .333 | 1    |
| newcf    |        | 1 | 1 | .444 | .667 | .667 | 1 | .222 | .333 | .333 | .667 |
| meancf   | 73.333 |   |   |      |      |      |   |      |      |      |      |
| newmeancf| 63.337 |   |   |      |      |      |   |      |      |      |      |

FIG. 8

|          | 0      | 1    | 2    | 3    | 4    | 5    | 6    | 7    | 8    | 9    | 10   |
|----------|--------|------|------|------|------|------|------|------|------|------|------|
| Object 1 | 1      | 1    | 1    | 1    | 1    | 1    | 1    | 1    | 1    | 1    | 1    |
| Object 2 | 0      | 1    | 0    | 1    | 0    | 1    | 0    | 1    | 0    | 1    | 0    |
| Object 3 | 0      | 1    | 0    | 0    | 1    | 0    | 0    | 1    | 0    | 0    | 1    |
|          |        |      |      |      |      |      |      |      |      |      |      |
| cf       |        | 1    | .333 | .667 | .667 | .667 | .333 | 1    | .333 | .667 | .667 |
| newcf    |        | .667 | .222 | .444 | .222 | .222 | .222 | .667 | .222 | .444 | .222 |
| meancf   | 63.333 |      |      |      |      |      |      |      |      |      |      |
| newmeancf| 35.556 |      |      |      |      |      |      |      |      |      |      |

FIG. 9

|          | 0      | 1    | 2    | 3    | 4    | 5    | 6    | 7    | 8    | 9    | 10   |
|----------|--------|------|------|------|------|------|------|------|------|------|------|
| Object 1 | 1      | 1    | 1    | 1    | 1    | 1    | 1    | 1    | 1    | 1    | 1    |
| Object 2 | 0      | 0    | 0    | 0    | 0    | 0    | 1    | 1    | 1    | 1    | 1    |
| Object 3 | 1      | 1    | 1    | 1    | 1    | 1    | 0    | 0    | 0    | 0    | 0    |
|          |        |      |      |      |      |      |      |      |      |      |      |
| cf       |        | .667 | .667 | .667 | .667 | .667 | .667 | .667 | .667 | .667 | .667 |
| newcf    |        | .667 | .667 | .667 | .667 | .667 | .222 | .667 | .667 | .667 | .667 |
| meancf   | 66.667 |      |      |      |      |      |      |      |      |      |      |
| newmeancf| 62.222 |      |      |      |      |      |      |      |      |      |      |

FIG. 10

|          | 0     | 1    | 2    | 3    | 4    | 5    | 6    | 7    | 8    | 9    | 10   |
|----------|-------|------|------|------|------|------|------|------|------|------|------|
| Object 1 | 1     | 1    | 1    | 1    | 1    | 0    | 1    | 1    | 1    | 1    | 1    |
| Object 2 | 1     | 0    | 1    | 0    | 1    | 1    | 1    | 0    | 1    | 1    | 1    |
| Object 3 | 1     | 1    | 0    | 1    | 1    | 1    | 0    | 1    | 1    | 1    | 1    |
|          |       |      |      |      |      |      |      |      |      |      |      |
| cf       |       | .667 | .667 | .667 | 1    | .667 | .667 | .667 | 1    | 1    | 1    |
| newcf    |       | .444 | .222 | .222 | .667 | .444 | .222 | .222 | .667 | 1    | 1    |
| meancf   | 80    |      |      |      |      |      |      |      |      |      |      |
| newmeancf| 51.11 |      |      |      |      |      |      |      |      |      |      |

FIG. 11

METHOD AND SYSTEM FOR REDUCING FALSE ALARMS IN NETWORK FAULT MANAGEMENT SYSTEMS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates to computer network fault management. In particular, the present invention relates to improved techniques for reducing false alarms in such systems by a finer correlation of variables.

The expense of service downtime, the limited supply of network engineers, and the competitive nature of today's marketplace have forced service providers to rely more and more heavily on software tools to keep their networks operating at peak efficiency and to deliver contracted service levels to an expanding customer base. Accordingly, it has become vital that these software tools be able to manage, monitor, and troubleshoot a network as efficiently as possible. An important aspect of such troubleshooting is the detection and analysis of network faults and their causes.

A variety of software is currently available that improves network management through automated fault analysis. For instance, the Netcool®/Visionary™ software available from Micromuse Inc. evaluates a network's health by correlating data gleaned from various network devices in accordance with a set of expert system rules. Each rule defines which data items or indicators, when detected together, indicate the presence or likelihood of a fault. For example, in formulating a diagnosis that a router's CPU is over-utilized, the software correlates relevant data that may have caused the problem, such as instability from a particular routing peer, poor access list configuration, and a forgotten debug setting.

System or device data can be correlated in a number of ways. For example, in the Netcool®/Visionary™ software, a window of time is divided into time slices and rule-based correlation is performed for each time slice. In each time slice, the software determines which of the indicators being monitored has reached a state of severity, and computes a percentage reflecting the number of such severe indicator states over the total number of indicators being monitored by the rule. If the result of the correlation is greater than a predetermined threshold percentage, the software marks the time slice as a positive result for the fault, an activity sometimes referred to herein as firing. If the rule fires for more than a threshold percentage of time slices during the time window, an alert or alarm is sent to a network management platform that the fault is likely to be occurring. For example, a rule with threshold percentage of 50% and a window size of 60 seconds, divided into twelve 5-second time slices, formulates a problem diagnosis when the rule has fired 6 or more times during the window.

The ability of software such as the Netcool®/Visionary™ program to predict problems and prevent them before they affect service uptime largely rests on the accuracy of the multivariable correlation. Accordingly, much effort goes into formulation of the rules and the selection of an appropriate set of indicators as relating to each type of fault being analyzed. However, even the best rules-based detection systems suffer from inherent problems arising from the generalized association of events and faults and the complex nature of large networks or other systems in which many related and unrelated events are occurring with great frequency.

Thus, rules-based correlation has a tendency to result in false alarms. For example, using the correlation techniques discussed above, while the intermittent positive detection of a severe condition in the three indicators considered by a rule may result in the rule firing and sending an alarm, the conditions may in fact be unrelated and coincidental and may in fact not be causing or otherwise related to the fault about which the alarm is sent. False alarms require the attention of service provider administrators and divert the resources needed to attend to real faults.

There is therefore a need for improved techniques for limiting the number of false alarms occurring during fault detection correlation.

SUMMARY OF THE INVENTION

It is an object of the present invention to solve the problems described above with existing fault correlation systems.

It is another object of the present invention to reduce the number of false alarms generated by fault detection systems.

It is another object of the present invention to improve the accuracy of and reduce noise in fault detection systems.

The above and other objects are achieved by improved techniques for correlating a number of variables or indicators in a rules-based correlation system. The techniques involve correlating over time the edges or transitions of indicators so that indicators which are not changing together are less likely to be correlated by a rule. Thus, software utilizing the improved techniques detects not only whether multiple variables are at given severities during each timeslice of a window, but also whether and how the variables changed severity from the prior timeslice. For example, if two or more indicators being monitored by a rule change state during a time slice, but one transitions from a positive state to a negative state and the other indicator transitions from negative to positive state, then an edge or transition factor is generated which makes the rule less likely to correlate the two indicators.

These improved techniques raise accuracy through noise reduction, but do not necessarily increase the fault detection rate. In other words, the presence of correlated edges does not make a rule any stronger than it would be if edge correlation was not considered, but the absence of edges having correlation should make the rule less likely to fire. Similarly, if the indicators of a rule would not cause the rule to fire, edge correlation should not cause it to fire. In a situation where the indicators changed to a positive severity state together, but there are no edges in the current window, the rule should not be less likely to fire. The complete absence of edges in a window should not count against the rule.

In some embodiments, edge correlation is an indicator specific attribute and is specified on a per indicator basis. For example, some rules use the presence of an indicator as part of the rule, and this indicator does not transition. As such, the indicator would detract from the rule's firing if edge correlation were applied to it, since other indicators are capable of transitioning. In these embodiments, indicators are assigned an edge relevance to limit or prevent their use in edge correlation.

The above and other objects of the present invention are also achieved through a method for improving diagnosis of a complex problem, such as a problem detected in a computer network or other environment where symptoms are multivariate and rapidly changing, wherein a plurality of indicators expected to relate to the network problem are correlated over a window of time. The window of time consists of a plurality of sequential time slices in each of which a state of each indicator is determined such as by probing or polling. The method involves determining which indicator or indicators changed state during a first time slice and which indicator or indicators did not change state during the first time slice. This comparison may be done for a number of time slices or preferably all the time slices in the window. In some embodiments, a transition is determined through frequent polling of the state of the indicators. In other embodiments, the transition is found by comparing the state of each of the indicators in the first time slice in the window, such as at the end of the time slice, with the state of the respective indicators in a second time slice immediately preceding the first time slice.

The method further involves computing a time slice transition or edge factor based upon the number of indicators whose state changed and a number of indicators whose state did not change during the first time slice. This transition factor is then used to adjust the correlation of the indicators over the window of time. In some embodiments in which indicators are correlated based on their states in each time slice, the time slice transition factor is used to adjust the correlation by applying it to the specific correlation for the first time slice. When the transitional determination is made for multiple or all time slices, multiple transition factors are generated, one for each time slice, and each is applied to the correlation for the respective time slice.

In some embodiments, the indicators have a plurality of possible states including a low state and a high state, and determining changes in the states of the indicators involves determining which indicator or indicators changed state from low to high and which indicator or indicators changed state from high to low. This determination may then form the basis for computing the time slice transition factor by, for example, identifying a maximum among the number of indicators whose state did not change, the number of indicators whose state changed from low to high, and the number of indicators whose state changed from high to low, and dividing the maximum by the total number of indicators. This results in a ratio of correlated transitions over total indicators. The ratio has a value necessarily no greater than one, thus supporting the result explained above that the use of edge or transition correlation decreases not increases the likelihood that indicators will be correlated.

The use of arbitrary boundaries for time slices and potential delays in measuring states of indicators may result in two or more indicators which actually changed state very close in time to be considered to have changed state in different time slices. Thus, in some embodiments, this problem of jitter is solved by adjusting the first time slice to account for potential delays in determining states of the indicators. This adjustment may be accomplished by using different lengths of time slices which reflect the measurement delays. Alternatively, this adjustment may be accomplished by determining which indicator, if any, changed state last in time during the first time slice, determining whether any other indicators changed state during a predefined period preceding the time of last indicator state change, and considering such other indicators whose state changed during the predefined period as having occurred during the first time slice. The predefined period may be the same interval as the interval of the time slices.

Objects of the present invention are also achieved by a method for reducing false alarms in a system for analyzing faults in devices. The system correlates a plurality of indicators over a window of time and generates alarms based upon the correlation, with the window of time having sequential time slices in each of which a state of each indicator is probed. The method involves detecting whether and how transitions occurred in the states of the indicators during a first time slice. A time slice transition factor is computed that relates the number of the indicators whose state changed in similar fashion or did not change during the first time slice to the total number of indicators, and this transition factor is used to adjust the correlation of the indicators over the window of time. If the factor reflects a lack of full correlation in the transitions during the first time slice, the correlation of the indicators is reduced, thus reducing the likelihood that a false alarm will be generated.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIGS. 6-11 are exemplary data structures of indicator states over time and corresponding correlation factors which illustrate applications of embodiments of the present invention.

DETAILED DESCRIPTION OF THE PREFERRED EMBODIMENTS

Figure 1:
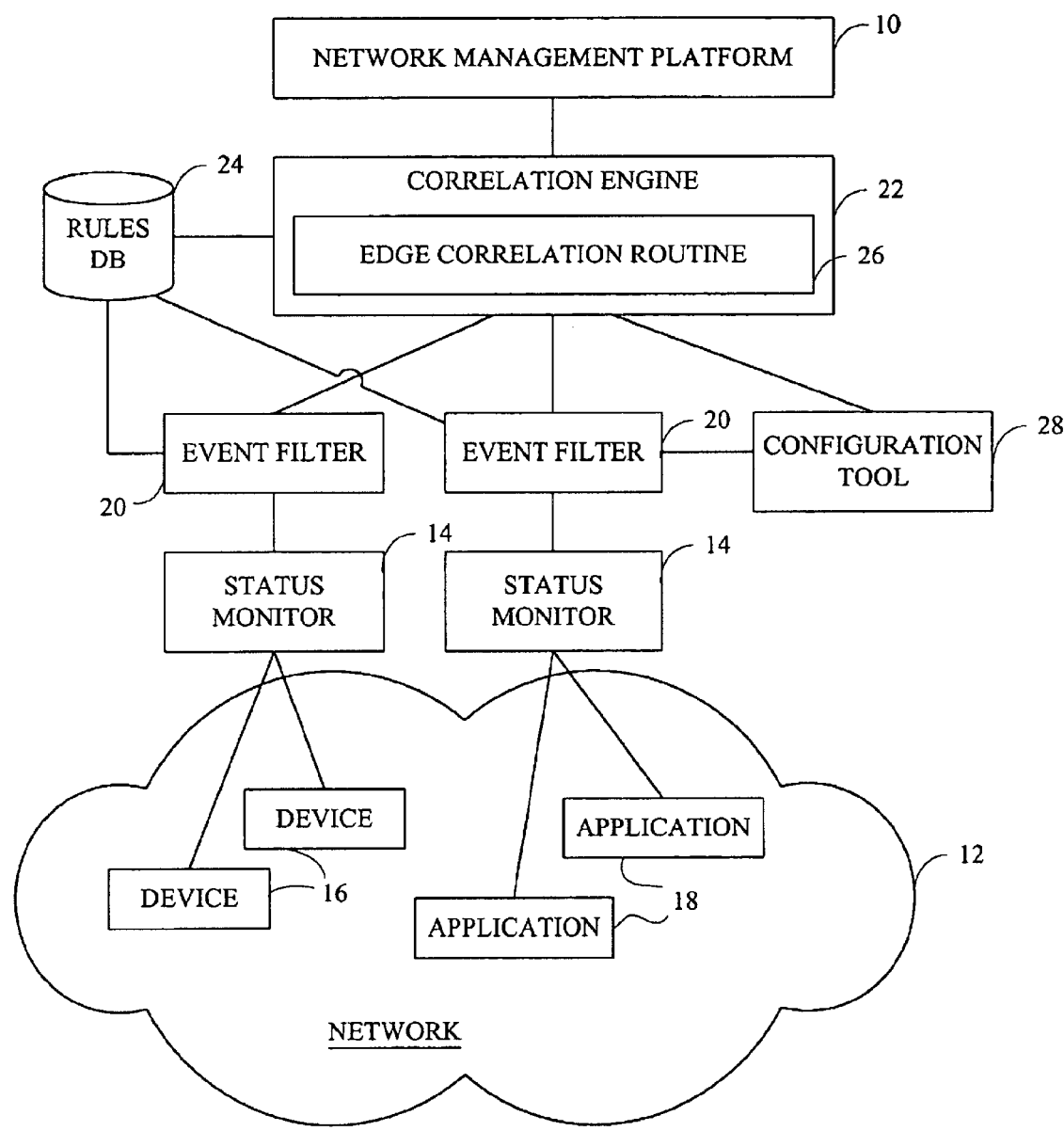
FIG. 1 is a block diagram showing a network management system including an edge correlation component in accordance with embodiments of the present invention.

Preferred embodiments of the present invention are now described with reference to the drawings in FIGS. 1-11. Referring to FIG. 1, a system is shown for detecting the occurrence of faults in a network in accordance with the present invention. The system includes a network management platform 10 which consolidates, manages and presents event information relating to a network 12 to network administrators. An exemplary network management platform 10 is the NETCOOL® suite of programs available from Micromuse Inc. The system further includes a set of status monitors 14 which poll devices 16 and software applications 18 connected or operating over the network 12. Devices 16 include many types of hardware devices such as CPUs, routers, printers, network interface cards, etc., and applications include many types of programs such as operating systems, server programs, browsers, security systems, etc.

The status monitors 14 collect many raw data values from industry standard SNMP management information databases within each managed or monitored network element on a substantially continuous basis, e.g., every second or every few seconds. The status monitors 14 normalize the raw data values as described below and feed the collected, normalized data to a set of event filters 20, sometimes referred to as or forming part of brokers, which manage the exchange of data collected by status monitors to other components of the system. Each status monitor uses a configuration file that specifies what SNMP objects it should monitor, how often it should poll those objects, and how it should interpret the results. The objects being monitored or instances of those objects are sometimes referred to herein as indicators, although indicators may include further information such as data on how to interpret the value of an object. The event filters 20 reduce the overall number of events detected by the status monitors 12 by isolating and sending only events that indicate a change in severity level in the monitored device or application.

The event data filtered and transmitted by the event filters 20 is received and processed by one or more correlation engines 22. The correlation engine 22 receives the normalized, filtered event data, either from the event filters 20 or directly from the status monitors 14 through a subscription mechanism, and performs high-speed consolidation, correlation and analysis of the information to identify whether problems are occurring or likely to occur in the network. This analysis is performed by retrieving one or more rules from a rules database 24. The rules dictate which indicators or properties of the devices 16 or applications 18 being monitored by the status monitors 14, when found to be occurring together, are symptomatic of a given defined problem or fault. Rules are typically developed based on historical experience or other substantive expertise.

The rules are used by the correlation engine 22 to determine whether an alert or alarm should be sent to a network administrator informing him or her of the detection of the problem. When the correlation engine 22 receives the configuration files from event filters 20 and locates the rules which use the data, the engine 22 determines which indicators it needs data for in order to invoke the rules, and polls the status monitors 14 to subscribe to the event data for these indicators. The correlation engine 22 may also receive some event data as part of the configuration files. In some embodiments, the event filters 20 may also consult the rules to determine which event data received from status monitors 14 to filter and which to pass along to the correlation engine 22.

In accordance with the invention, the correlation engine 22 also includes an edge correlation routine 26 which improves the accuracy of the rule-based correlation performed by the correlation engine 22 and reduces the number of false alarms generated by the engine 22. The edge correlation routine 26, described in greater detail in the remainder of this specification, analyzes trends or transitions in the states of the indicators examined by the rule to determine how closely the various indicators are tracking to one another. Thus, while the correlation engine 22 may use any known technique to correlate event data relating to a number of devices or applications, the edge correlation routine 26 computes an edge or transition factor which is applied to the correlation produced by the correlation engine.

A configuration tool 28 is provided in the system to allow administrators to manipulate the system and perform administrative functions such as adding or deleting filters, devices, or applications and starting and stopping the correlation engine. The configuration tool 28 also allows administrators to view results and modify settings controlling the operation of the system components, such as the severity levels used in filtering data or the threshold values used in generating alarms. This configuration tool 28 may be directly coupled to and in control of the correlation engine 22, or may be part of a system-wide configuration subsystem coupled to the network management platform 10 and used in controlling not only the correlation engine but other products forming part of the network management platform 10.

Each of the components shown in FIG. 1 may be implemented in computer hardware, software, or some combination of the two. For a component implemented as a software program, the program is stored in a memory device readable by a computer to cause the computer to perform the functions and methods described herein. Two or more of the components may be part of a single overall system, or may be remotely located and communicate with one another over any telecommunication network or system and using any desired protocol, including communication over the Internet, wireless technology, satellite, cable systems, etc.

Figure 2:
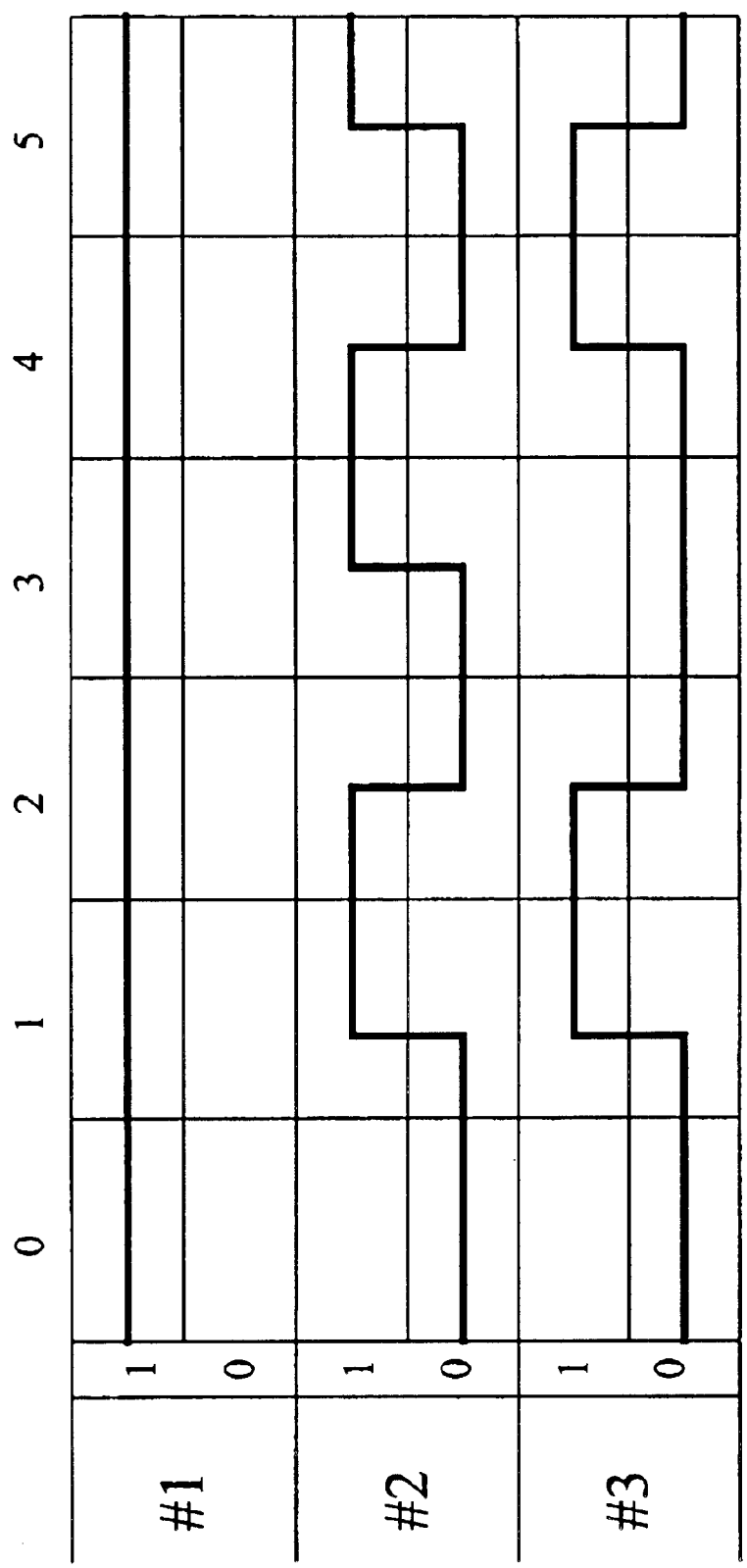
FIG. 2 is a timing diagram illustrating concepts underlying the present invention.

The basic methodology of reducing false alarms through edge correlation is now described with reference to the illustration in FIG. 2 and the flow chart in FIG. 3. As shown in FIG. 2, an exemplary rule used to diagnose a given problem involves analysis of three indicators identified as indicators 1, 2 and 3. In this simplified illustration, each indicator may have two possible states—0 and 1—with one of the states representing a severity condition and the other representing a normal operating condition. As shown in the illustration, indicator 1 remains at state 1 while indicators 2 and 3 change state over time. If the rule provides that the three indicators be collectively at a state of 1 for more than half the time, the correlation engine would determine from this illustration that the rule is satisfied and thus an alert should be generated.

However, a closer examination of FIG. 2 reveals that in fact the states of the indicators may not be sufficiently related to draw a conclusion that the problem defined by the rule is occurring. For example, indicator 1 is always at state 1 and does not transition as the other indicators do. Also, while indicators 2 and 3 transition together in times 1 and 2, they transition in different fashion in times 3, 4, and 5. This lack of coincidence in the transitions of the three indicators over time shows that, while as a general matter as defined by the rule the presence of these three indicators is indicative of a problem, in this case their concurrence may in fact be unrelated or caused by separate, unconnected conditions. Thus, the indicators should not necessarily be correlated and an alarm need not be sent.

Figure 3:
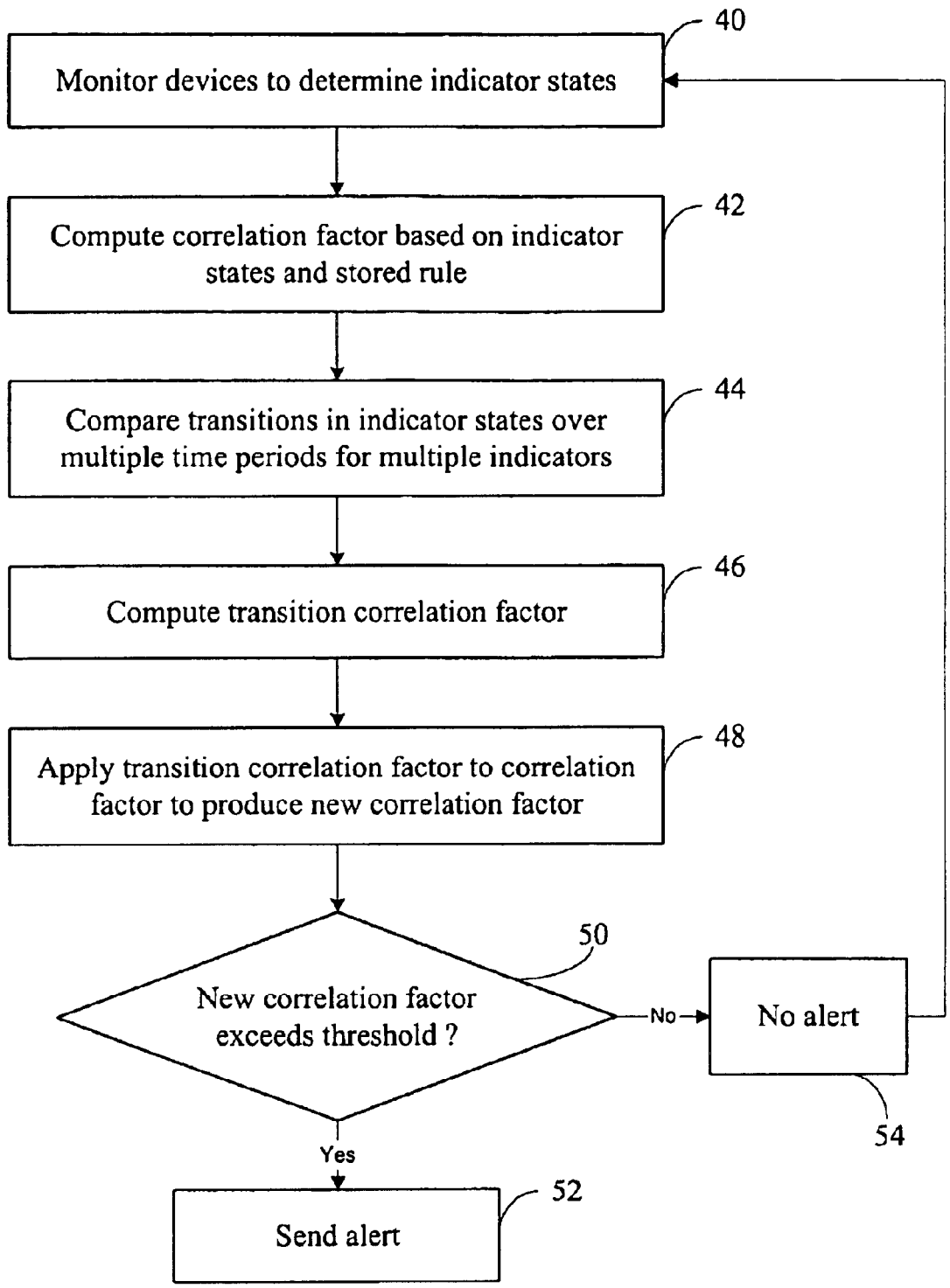
FIG. 3 is a flow chart showing a process of using edge correlation to reduce false alarms in accordance with embodiments of the present invention.

Referring then to FIG. 3, a process in accordance with the invention involves monitoring devices to determine indicator states, step 40. The correlation engine computes a correlation factor based on the states of the indicators and the stored rule, step 42. The edge correlation routine compares the transitions of the indicator states over multiple discrete time periods for the monitored indicators, step 44. This analysis reveals the extent of coincidence of transitions of indicators during each time period, and is used to compute a transition correlation factor, step 46. As described in greater detail below, in some embodiments the transition correlation factor represents the ratio between the number of times the indicators transitioned together to the total number of indicators. However, other mathematical factors may be used which capture the extent of correlation between transitions in indicator states, as will be recognized by those of skill in the art.

The transition factor is applied to the correlation factor to produce a new correlation factor, step 48. If the new correlation factor exceeds a threshold, step 50, indicating that the correlation is still sufficiently close to indicate the presence of the problem per the rule, the correlation engine generates and sends an alert message to the network management platform, step 52, so that the administrator becomes aware of the potential problem. This threshold may be predetermined from prior experience and set forth in the rule, or may be generated or adjusted from a predefined value based on values found in the transition correlation process described herein. For example, a predefined threshold value may be adjusted to account for a somewhat lower expected value of the correlation factor based on the number of indicators relevant to this transition analysis, the number of time slices in the window, the number of transitions, or other values. If the new correlation factor does not exceed the threshold, no such alert message is sent, step 54.

Figure 4A:
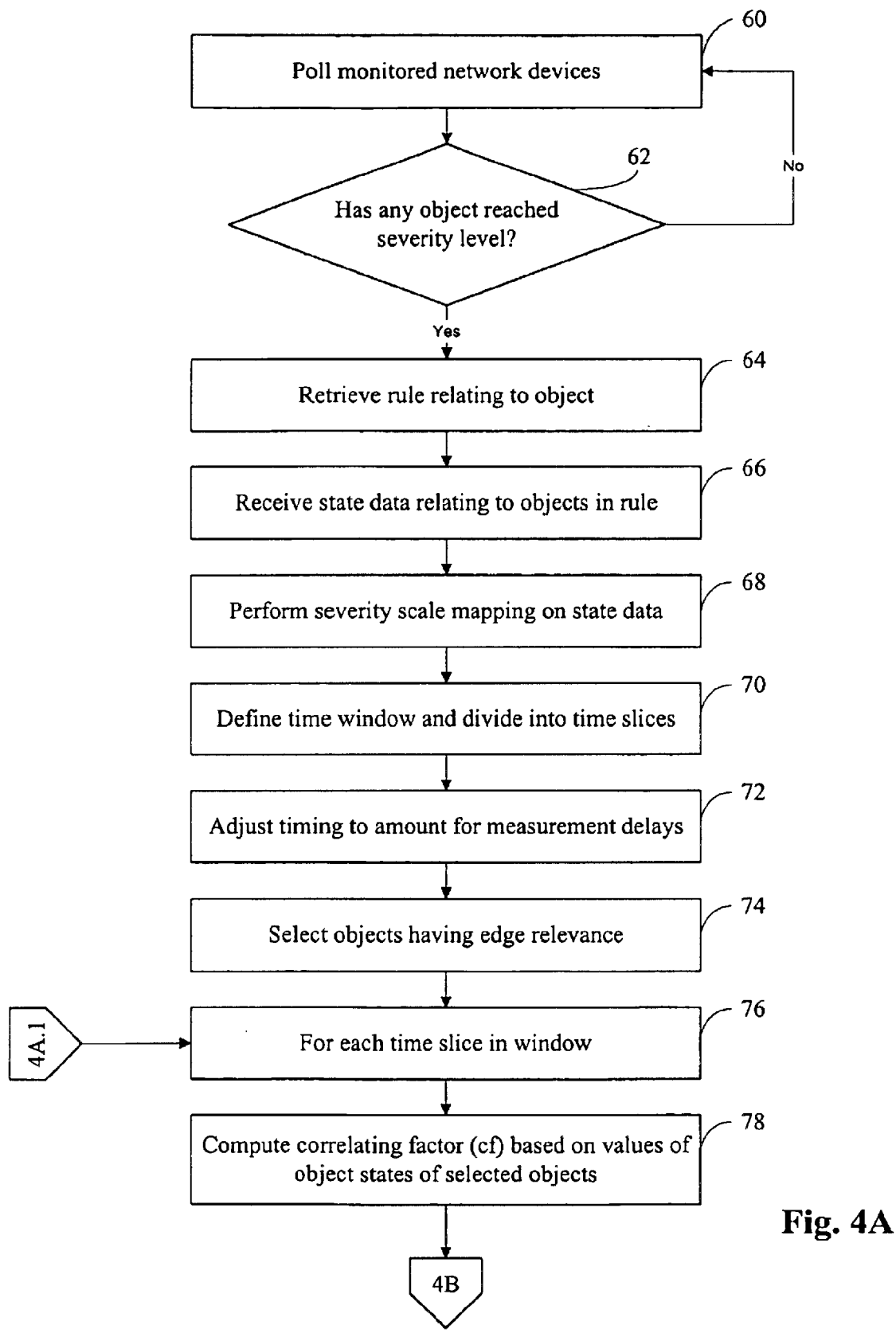
FIGS. 4A-4B contain a flow chart showing the process of FIG. 3 is greater detail in accordance with embodiments of the present invention.
Figure 4B:
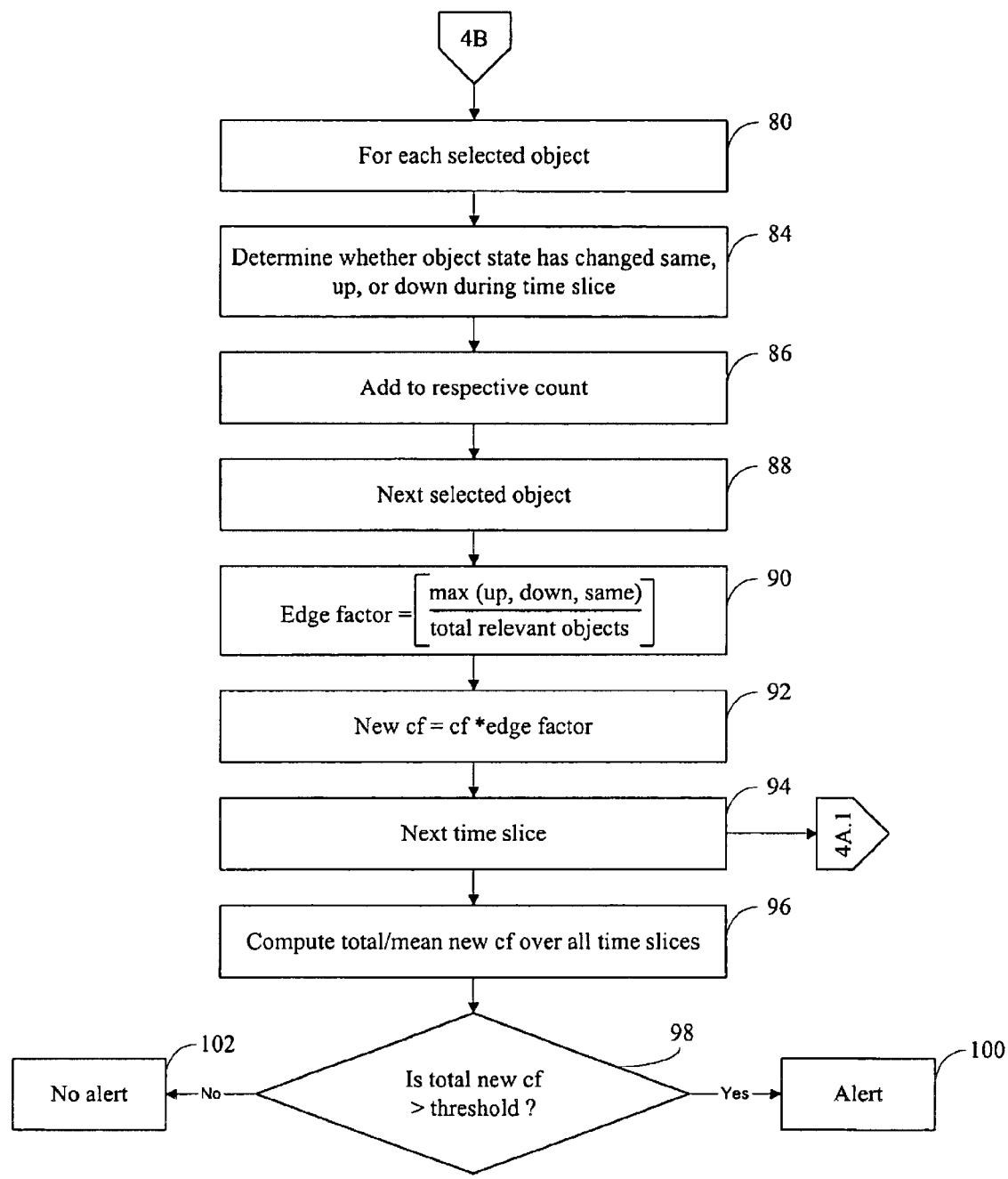

FIGS. 4A-4B contain a flow chart showing one embodiment of this process used in conjunction with a specific correlation technique. In this technique, a window of time under consideration to determine whether a problem is occurring is divided into a number of discrete time slices, and a correlation factor for the indicators in the rule is generated for each time slice. The correlation factors are then combined over the entire window such as by calculating a mean correlation factor or a ratio of the number of times a correlation factor reached a threshold divided by the total number of time slices. This technique is employed, for example, in the Netcool®/Visionary™ program available from Micromuse Inc.

Referring to FIG. 4, the status monitors poll the monitored network devices or applications, step 60. The filters determine whether any of the monitored objects has reached a predefined severity level, step 62, and only allows the monitored event data to pass to the correlation engine when such level is reached to avoid overloading the engine with data. The correlation engine retrieves the one or more rules relating to the object for which a severity condition was reached, step 64, and further retrieves the state data relating to the other objects referenced in the rule, step 66.

Because the raw data collected by the status monitors is in disparate units specific to the device or application being monitored, e.g., number of instructions per second for a CPU, messages routed for a router, requests or hits for a server, etc., it is necessary to normalize the raw data so that an effective comparison may be done under the rule. Thus, severity mapping is performed on the collected state data, step 68, by converting the raw data to predefined states in accordance with a lookup table or similar mechanism for the device or application. The severity mapping may simply convert the raw data to one of two states, e.g., a high/low state or working/nonworking state, or may include additional gradations reflecting layers of severity.

A time window is defined during which the indicators in the rule are correlated, and this window is divided into sequential time slices, step 70. The length of the time window and time slices may be set as fixed amounts for all indicators or may be set in a particular rule, e.g., the rule defining how much indicators must correlate before correlation is found. As explained further herein, the edge correlation relies upon a concept of edges transitioning in the same timeslice. However, edges may not always transition in the same timeslice given varying polling intervals, response times from targets, etc. Thus, the engine adjusts the timing of the time slice being used to account for these measurement delays, step 70.

This adjustment may be performed in several different ways. One possible way is to increase the size of the timeslice to, e.g., six seconds, and to use a timeslice increment of three seconds when performing timeslice analysis. Another adjustment solution is for the correlation engine to examine, for each timeslice, all of the indicators that have changed in that timeslice. Of those that have changed, the engine starts with the one that has changed most recently and looks at the last changed time for all of the other indicators. If they have changed in the same direction in the past 5 seconds from the timestamp of the most recently changed indicator, they are considered to be correlated for the sake of calculating the edge factor. These solutions handle edges that fall in different timeslices.

To help better illustrate this point, the options are examined in turn. For all options, the following data set is used:

Object 1: Transitions UP at time 2, DOWN at time 11, UP at time 18, DOWN at time 23

Object 2: Transitions UP at time 4, DOWN at time 11, UP at time 16, DOWN at time 27

If no timing adjustment mechanism is used, with the above objects, and time-slices starting at t=1, two timeslices would be impacted, slice (20-24) when object 1 transitioned down and then slice 25-29 when object 2 transitioned down. If the timeslices started at timeslice 2, three timeslices would be impacted by a lack of edge correlation. The data for using no timing adjustment mechanism are summarized in Table I below:

TABLE I

| Starting Time | Number of timeslices (out of 6) with edge factor < 1 |
|---|---|
| T = 0 | 2 |
| T = 1 | 2 |
| T = 2 | 4 |
| T = 3 | 3 |
| T = 4 | 3 |

If fractional slice increments are used, the first slice would be 0-5, and would see two edges go up. The next slice would be 3-8 and would see object 2 go up while object 1 stayed high. This would be an edge factor of 0.5, in accordance with the formulas provided below. The next slice would be 6-11 and would see both edges go down. The next slice, 9-14, would see both edges go down. The next slice, 12-17, would see object 2 go up and object 1 stay down. The next slice would be 15-20, and would see both edges go up. The next slice, 18-23 would see object 1 go down and object 2 stay high. The next slice, 21-26, has one edge go down. The next slice 24-29 has object 2 down, object 1 even.

This comes out to 9 slices, of which 5 showed no correlation. This number seems too high, to the extent it produces a result of 55% of the slices showing a lack of correlation, which does not appear to reflect the actual conditions. If the time slices start at t=1 instead of t=0, only 3 slices out of 9 are left not showing correlation. Starting at t=3 results in 5 slices without correlation, which represents too high and too wide a variance from other starting point configurations. Data on some results is summarized in Table II below.

TABLE II

| Starting Time | Number of timeslices (out of 9) with edge factor < 1 |
|---|---|
| T = 0 | 5 |
| T = 1 | 3 |
| T = 2 | 4 |

Under the "last event time" method, if the time slices start at time=0, and have timeslices at t=5, 10, 15, 20, 25, 30, then there is only one timeslice (t=20-24) when an edge transitioned and was not considered correlated. In this timeslice, Object 1 transitioned down, but Object 2 was still UP. At t=25-29, Object 2 transitioned down, but Object 1 appears to have transitioned down only 4 seconds earlier. Therefore it may be counted as transitioning down for the purposes of calculating the edge factor for this timeslice.

If the timeslices start at t=2, additional timeslices are at t=7, 12, 17, 22, 27, 32. In the first timeslice (2-6) both edges went up. In the second timeslice (7-11) both edges went down. In the third timeslice, (12-16), Object 2 went up and Object 1 showed a transition down 5 seconds earlier. This would create an edge factor of 0.5 for this timeslice. In the fourth timeslice (17-21) there were no edges. In the fourth timeslice (22-26) Object 1 transitioned down and object 2 remained high. An edge factor of 0.5 is calculated for this timeslice. In the next timeslice, (27-31) Object 2 transitioned down, and Object 1 had transitioned down four seconds earlier. Therefore they are both in correlation, and the edge factor is 1 for this timeslice.

Use of the last event time timing adjustment technique provide the results shown in Table III below.

TABLE III

| Starting Time | Number of timeslices (out of 6) with edge factor < 1 |
|---|---|
| t = 0 | 1 |
| t = 1 | 1 |
| t = 2 | 2 |
| t = 3 | 1 |
| t = 4 | 1 |

The proper handling of timing adjustment maintains the benefits of edge correlation's noise reduction while avoiding the inaccuracies of arbitrary timeslice boundaries. Using the "last event time" mechanism appears to give the most benefit with the least variance due to timeslice boundary location.

Returning to FIG. 4A, the edge correlation routine begins the process of correlating objects based on their transitions. It selects those of the objects in the rule which have been assigned edge relevance, step 74. That is, a factor is assigned to each object in the rule which sets whether its transitions are relevant and should be included in an edge correlation analysis. For example, there are some rules written that use the presence of an indicator as part of the rule, but this indicator does not transition and as such would always detract from the rule's firing if edge correlation were applied to it. Edge relevance for each object is stored in the rule.

The following analysis is then performed for each time slice in the window, step 76. The correlation engine computes a correlation factor based on the state values of relevant or selected objects, step 78. This correlation factor may be an average of the state values, a weighted average, or any other desired computation set forth in the rule. For each selected object, step 80 (FIG. 4B), the object's state in the current time slice is analyzed to determine whether the object's state has remained the same, gone up, or gone down, step 84, as these time slices may have been adjusted as described above. This analysis may be performed using known techniques for detecting transitions in the state of an object, such as based upon frequent polling or measuring usage data, as further described in commonly owned patent application Ser. No. 09/724,025, attorney docket no. 3882/3, titled "METHOD AND SYSTEM FOR PREDICTING CAUSES OF NETWORK SERVICE OUTAGES USING TIME DOMAIN CORRELATION," which application is hereby incorporated by reference into this application. Alternatively, this determination that a transition has occurred may be made by comparing the object's state during or at the end of the current time slice with its state at the end of the immediately preceding time slice, and detecting a transition if these two states are different. If the severity scale allows for more than two states, this determination allows for a greater number of possible state changes. A count is maintained for each type of state change determination, step 86, and the next selected object is considered, step 88, until all relevant objects have been considered.

The edge correlation routine then computes an edge correlation factor, step 90, using the following formula:

$$\text{Edge cf} = \text{Max}(\text{upcount}, \text{downcount}, \text{samecount})/(\text{total number of relevant objects})$$

This formula provides that the edge correlation factor represents the percentage of the largest trend in object transitions over the total number of objects. The edge correlation factor is then multiplied by the correlation factor for the time slice, step 92, to produce a new correlation factor which is discounted from the old correlation factor to account for less than full correlation in the transition of objects during the time slice. This process is repeated for all time slices in the window, step 94, until all such slices have been processed.

As a result, a set of new correlation factors has been computed, one for each time slice. An overall correlation factor is then computed, step 96. This new overall correlation factor may be computed as the mean of the individual new correlation factors for the time slices. Alternatively, the overall factor may be found by determining in each time slice whether the slice's factor exceeds a predefined threshold and thus the rule applies or "fires," and then adding up the number of times the rule fired during the time window. In either case, the overall correlation factor is compared to an appropriate threshold, step 98, to determine whether an alert should be sent, step 100, or no alert should be sent, step 102.

In accordance with the invention, there may be logical groupings of indicators in which the components are expected to move together but the groups themselves are not expected to necessarily move together. This leads to embodiments of the present invention which account for edge correlation groups. The field in the rule used to indicate whether an indicator should be edge correlated may also be used to specify the edge correlation group to which the indicator belongs. For example, in the example show in Table IV, indicators 1–3 belong to group A, indicators 4–5 belong to group B, and indicators 6–7 have no edge relevance. The edge correlation factor would be computed separately for the "A" group and the "B" group, and no edge correlation is performed on indicators 6 and 7. Thus, if $2/3$ of group A correlate and $1/2$ of group B correlate, the edge factor would be $2/3 * 1/2 = 0.333$, instead of $3/5 = 0.600$ if calculate without groupings.

TABLE IV

| Indicator # | Edge Relevance/Group |
|---|---|
| 1 | A |
| 2 | A |
| 3 | A |
| 4 | B |
| 5 | B |
| 6 | N |
| 7 | N |

Figure 5:
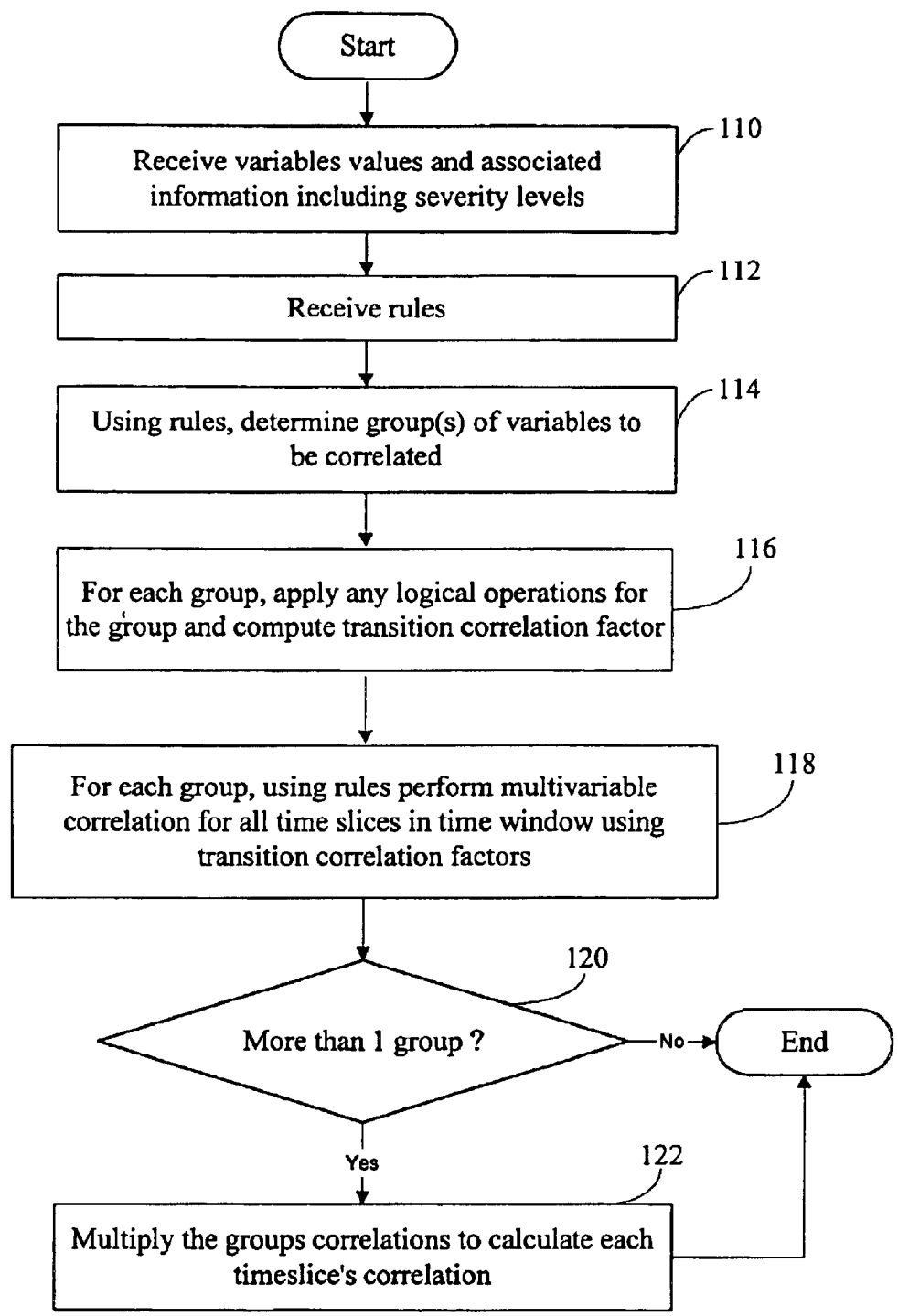
FIG. 5 is a flow chart showing a process of correlating edges of groups of indicators in accordance with embodiments of the present invention.

Referring then to FIG. 5, a process for correlating edges with groups of indicators is shown. As described in greater detail above, the indicator values and severity levels are received, step 110, as are the appropriate rule(s), step 112.

From the rules, the group or groups of indicators, if any, are determined, step 114. The use of grouping supports various logical operations among members of a group, allowing for differences in the treatment of indicators across groups during edge correlation. These logical operations are applied, step 116, to compute transition correlation factors for each group.

The correlation engine, in conjunction with the edge correlation routine, performs multivariable correlation for each time slice, including accounting for transitions by applying transitions correlation factors found on a group basis, step 118. If only one group is present in any given time slice, step 120, then the new correlation factor found for that group is the factor used for that time slice. If more than one group is present, then the new correlation factors found for each group are multiplied to produce the factor to be used for the time slice, step 122. Combining of these factors then proceeds as described earlier.

FIGS. 6-11 illustrate various examples of the use of edge correlation to reduce the likelihood of false alarms. The formula used in these examples is essentially the same as set forth earlier:

$$newcf = (\max(upindicators, downindicators, sameindicators)/numindicators)_A * [(\max(upindicators, downindicators, sameindicators)/numindicators)_B] * cf,$$

wherein:

newcf represents the new correlation factor, e.g., for a given time slice, after application of the edge correlation metholodgy described herein;

upindicators, downindicators and sameindicators represent the number of state changes of type up, down, or same (no change), respectively, for indicators having edge relevance in a rule, e.g., in a give time slice;

numindicators represents the total number of indicators having edge relevance in a rule, e.g., in a give time slice; and cf represents the base correlation factor found using multivariable correlation techniques such as those described herein.

For these examples, the rule monitors three indicators, with each indicator having an edge relevancy factor (rf) of 1. The indicators will be either at severity level (sev) 1 or sev 0, and the sev-scale mapping maps a sev 1 to a value of 1, and a sev 0 to a value of 0. The computation performed by the edge correlation routine starts with timeslice 0 to see the transitions into timeslice 1, and calculate the meancf (average cf)on timeslices 1–10.

FIG. 6 demonstrates that a rule firing at 100% with no edges is not impacted by the edge correlation computation.

FIG. 7 demonstrates that a rule with all indicators tracking is not impacted by edge correlation.

FIG. 8 demonstrates that the rule is weakened as a result of lack of complete transition correlation, in time slices 3, 7, and 10, but may still fire if the indicators track and there are not many edges.

FIG. 9 shows that in a situation where one indicator is pegged high, another alternates high and low, and the third alternates (mostly off), that the rule would have fired without edge correlation, but the use of edge correlation techniques as described herein reduced cf below the firing threshold.

FIG. 10 indicates that edges are needed in order for edge correlation to have the most impact. The rule would fire at 66.66% without edge correlation (as $\frac{2}{3}$ of the indicators are always high) but only at 62.22% with edge correlation. The example demonstrates that edge correlation is most effective when indicators are transitioning more frequently.

FIG. 11 well illustrates the effectiveness of edge correlation. Simulating a noisy environment, it may be seen that the rule would otherwise have fired at a mean cf of 80, but edge correlation reduces it down to a newmeancf of 51.11. If the window were larger and more edges present, this newmeancf would be even lower.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for improving diagnosis of a complex problem, wherein a plurality of indicators expected to relate to the problem are correlated over a window of time, the window of time comprising a plurality of time slices in each of which a state of each indicator is determined, the method comprising:

determining which indicator or indicators changed state during a fist time slice in the window and which indicator or indicators did not change state during the first time slice;

computing a time slice transition factor based upon a number of indicators whose state changed and a number of indicators whose state did not change during the first time slice; and adjusting the correlation of the indicators over the window of time using the time slice transition factor.

2. The method of claim 1, wherein determining state changes in each of the indicators comprises determining the state changes of each indicator in each of a plurality of time slices in the window.

3. The method of claim 2, wherein computing a time slice transition factor comprises computing a plurality of time slice transition factors, and wherein adjusting the correlation of the indicators comprises adjusting the correlation using the plurality of time slice transition factors.

4. The method of claim 1, wherein determining state changes comprises comparing the state of each of the indicators in the first time slice with the state of the respective indicator in a second time slice preceding the first time slice.

5. The method of claim 4, wherein the second time slice immediately precedes the first time slice.

6. The method of claim 1, wherein indicators have a plurality of possible states including a low state and a high state, and wherein determining state changes in the indicators in the first time slice comprises determining which indicator or indicators changed state from low to high and which indicator or indicators changed state from high to low.

7. The method of claim 6, wherein computing the time slice transition factor comprises computing the transition factor further based upon a number of indicators whose state changed from low to high and a number of indicators whose slate changed from high to low.

8. The method of claim 7, wherein computing the time slice transition factor comprises identifying a maximum among the number of indicators whose state did not change, the number of indicators whose state changed from low to high, and the number of indicators whose state changed from high to low, and dividing the maximum by the number of indicators.

9. The method of claim 1, wherein indicators arc correlated based on the states or the indicators in each time slice, and wherein adjusting the correlation comprises applying the time slice transition factor to the correlation for the first time slice.

10. The method of claim 1, wherein the indicators are grouped into two or more groups of indicators, and wherein computing the time slice transition factor comprises computing a time slice transition factor for each group based upon the numbers of indicators in each group whose state changed or did not change during the time slice.

11. The method of claim 1, wherein determining indicator state changes comprises adjusting the first time slice to account for potential delays in determining states of the indicators.

12. The method of claim 11, wherein adjusting the first time slice to account for potential delays comprises:
   determining which indicator, if any, changed state last in time during the first time slice;
   determining whether any other indicators changed state during a predefined period preceding the time of last indicator state change; and
   considering such other indicators whose state changed during the predefined period as having occurred during the first time slice.

13. The method of claim 1, comprising storing a transition relevance factor in association with each indicator representing whether the indicator is relevant, and wherein determining state changes comprises determining the changes only for relevant indicators.

14. In a system for analyzing faults in devices by correlating a plurality of indicators over a window of time and generating alarms based upon the correlation, the window of time comprising a plurality of time slices in each of which a state of each indicator is probed, a method for reducing false alarms comprising:
   determining which of the indicators changed state in similar fashion during a first time slice in the window or did not change state during the first time slice;
   computing a time slice transition factor that relates a number of the indicators whose state changed in similar fashion or did not change during the first time slice to a total number of the indicators; and
   adjusting the correlation of the indicators over the window of time using the time slice transition factor.

15. The system of claim 14, wherein determining state changes in each of the indicators comprises determining the state changes of each indicator in each of a plurality of time slices in the window.

16. The system of claim 15, wherein computing a time slice transition factor comprises computing a plurality of time slice transition factors, and wherein adjusting the correlation of the indicators comprises adjusting the correlation using the plurality of time slice transition factors.

17. The system of claim 14, wherein determining state changes comprises comparing the state of each of the indicators in the first time slice with the state of the respective indicator in a second time slice preceding the first time slice.

18. The system of claim 17, wherein the second time slice immediately precedes the first time slice.

19. The system of claim 14, wherein indicators have a plurality of possible states including a low state and a high state, and wherein determining state changes in the indicators in the first time slice comprises determining which indicator or indicators changed state from low to high and which indicator or indicators changed state from high to low.

20. The system of claim 19, wherein computing the time slice transition factor comprises computing the transition factor further based upon a number of indicators whose state changed from low to high and a number of indicators whose state changed from high to low.

21. The system of claim 20, wherein computing the time slice transition factor comprises identifying a maximum among the number of indicators whose state did not change, the number of indicators whose state changed from low to high, and the number of indicators whose state changed from high to low, and dividing the maximum by the number of indicators.

22. The system of claim 14, wherein indicators are correlated based on the states of the indicators in each time slice, and wherein adjusting the correlation comprises applying the time slice transition factor to the correlation for the first time slice.

23. The system of claim 14, wherein the indicators ate grouped into two or more groups of indicators, and wherein computing the time slice transition factor comprises computing a time slice transition factor for each group based upon the numbers of indicators in each group whose state changed or did not change during the time slice.

24. The system of claim 14, wherein determining indicator state changes comprises adjusting the first time slice to account for potential delays in determining states of the indicators.

25. The system of claim 24, wherein adjusting the first time slice to account for potential delays comprises:
   determining which indicator, if any, changed state last in time during the first time slice;
   determining whether any other indicators changed state during a predefined period preceding the time of last indicator state change; and
   considering such other indicators whose state changed during the predefined period as having occurred during the first time slice.

26. The system of claim 14, comprising storing a transition relevance factor in association with each indicator representing whether the indicator is relevant, and wherein determining state changes composes determining the changes only for relevant indicators.

27. A computer readable medium storing program code which, when executed, causes a computer to perform a method for reducing false alarms in a system for analyzing problems by correlating a plurality of indicators over a window of time and generating alarms based upon the correlation, the window of time comprising a plurality of time slices in each of which a slate of each indicator is probed, the method comprising:
   determining which of the indicators changed state in similar fashion during a first time slice in the window or did not change state during the first time slice;
   computing a time slice transition factor that relates a number of the indicators whose state changed in similar fashion or did not change during the first time slice to a total number of the indicators; and
   adjusting the correlation of the indicators over the window of time using the time slice transition factor.

28. The computer readable medium of claim 27 wherein the method performed by the program comprises determining the state changes of each indicator in each of a plurality of time slices in the window.

29. The computer readable medium of claim 28 wherein the method performed by the program comprises computing a plurality of time slice transition factors and adjusting the correlation using the plurality of time slice transition factors.

30. The computer readable medium of claim 27, wherein indicators have a plurality of possible states including a low state and a high state, and wherein the method performed by the program comprises determining which indicator or indicators changed state from low to high and which indicator or indicators changed state from high to low.

31. The computer readable medium of claim 30 wherein the method performed by the program comprises computing the transition factor further based upon a number of indicators whose state changed from low to high and a number of indicators whose state changed from high to low.

32. The computer readable medium of claim 27 wherein the method performed by the program comprises computing the time slice transition factor by identifying a maximum among the number of indicators whose state did not change, the number of indicators whose state changed from low to high, and the number of indicators whose state changed from high to low, and dividing the maximum by the number of indicators.

33. The computer readable medium of claim 27, wherein the indicators are grouped into two or more groups of indicators, and wherein the method performed by the program comprises computing a time slice transition factor for each group based upon the numbers of indicators in each group whose state changed or did not change during the time slice.

34. The computer readable medium of claim 27, wherein a transition relevance factor is stored in association with each indicator representing whether the indicator is relevant, and wherein the method performed by the program comprises determining state changes only for relevant indicators.

35. The computer readable medium of claim 27, wherein the method performed by the program to determine state changes comprises comparing the state of each of the indicators in the first time slice with the state of the respective indicator in a second time slice preceding the first time slice.

36. The computer readable medium of claim 35, wherein the second time slice immediately precedes the first time slice.

37. The computer readable medium of claim 27, wherein the method performed by the program comprises correlating indicators based on the states of the indicators in each time slice, and wherein the method performed by the program for adjusting the correlation comprises applying the time slice transition factor to the correlation for the first time slice.

38. The computer readable medium of claim 27, wherein the method performed by the program for determining indicator state changes comprises adjusting the fast time slice to account for potential delays in determining states of the indicators.

39. The computer readable medium of claim 38, wherein the method performed by the program for adjusting the first time slice to account for potential delays comprises:
   determining which indicator, if any, changed state last in time during the first time slice;
   determining whether any ocher indicators changed state during a predefined period preceding the time of last indicator state change; and
   considering such other indicators whose state changed during the predefined period as having occurred during the first time slice.

40. A method for correlating a number of indicators in a rules-based correlation system, wherein a plurality of indicators each having multiple possible values and expected to relate to a problem are correlated over a window of time, the method comprising:
   dividing the window of time into a plurality of time slices;
   determining a value for each indicator during each of a plurality of the time slices;
   determining a transition state for each indicator during each of the plurality of time slices, the transition state representing whether and bow the indicator changed state during the time slice; and
   correlating the indicators over the window of time based upon the determined indicator values and transitions states.

41. The method of claim 40, wherein determining state changes comprises comparing the state of each of the indicators in a first time slice in tie plurality of time slices with the state of the respective indicator in a second time slice in the plurality of time slices preceding the first time slice.

42. The method of claim 41, wherein the second time slice immediately precedes the first time slice.

43. The method of claim 40, wherein the transition state for each indicator is a plurality of possible states including a low state and a high state, and wherein determining the transition state for die indicators in a first time slice in the plurality of time slices comprises determining which indicator or indicators changed state from low to high and which indicator or indicators changed state from high to low.

44. The method of claim 43, wherein determining the transition state is further based upon a number of indicators whose state changed from low to high and a number of indicators whose state changed from high to low.

45. The method of claim 44, wherein determining the transition state comprises identifying a maximum among the number of indicators whose state did not change, the number of indicators whose state changed from low to high, and the number of indicators whose state changed from high to low, and dividing the maximum by the number of indicators.

46. The method of claim 40, wherein the indicators are grouped into two or more groups of indicators, and wherein determining the transition state for each indicator comprises determining the transition state for each group based upon the numbers of indicators in each group whose state changed or did not change during each of the plurality of time slices.

47. The method of claim 40, wherein determining a transition state for each indicator comprises adjusting a first time slice to account for potential delays in determining states of each indicator.

48. The method of claim 47, wherein adjusting the first time slice to account for potential delays comprises:
   determining which indicator, if any, changed state last in time during the first time slice;
   determining whether any other indicators changed state during a predefined period preceding the time of last indicator state change; and
   considering such other indicators whose state changed during the predefined period as having occurred during the first time slice.

49. The method of claim 40, comprising storing a transition relevance factor in association with each indicator representing whether the indicator is relevant, and wherein determining a transition state for each indicator comprises determining transition state changes only for relevant indicators.

50. A computer readable medium storing program code which, when executed, causes a computer to perform a method for correlating a number of indicators in a rules-based correlation system, wherein a plurality of indicators each having multiple possible values and expected to relate to a problem arc correlated over a window of limit, the method comprising:
   dividing the window of time into a plurality of time slices;
   determining a value for each indicator during each of a plurality of the time slices;
   determining a transition state for each indicator during each of the plurality of time slices, the transition state representing whether and how the indicator changed state during the time slice; and correlating the indicators over the window of time based upon the determined indicator values and transitions states.

51. The computer readable medium of claim 50, wherein determining state changes comprises comparing the state of each of the indicators in a first time slice in the plurality of time slices with the state of the respective indicator in a second time slice in the plurality of time slices preceding the first time slice.

52. The computer readable medium of claim 51, wherein the second time slice immediately precedes the first time slice.

53. The computer readable medium of claim 50, wherein the transition state for each indicator is a plurality of possible states including a low suite and a high state, and wherein determining the transition state for the indicators in a first time slice in the plurality of time slices comprises determining which indicator or indicators changed state from low to high and which indicator or indicators changed state from high to low.

54. The computer readable medium of claim 53, wherein determining the transition state is further based upon a number of indicators whose state changed from low to high and a number of indicators whose state changed from high to low.

55. The computer readable medium of claim 54, wherein determining the transition state comprises identifying a maximum among the number of indicators whose state did not change, the number of indicators whose state changed from low to high, and the number of indicators whose state changed from high to low, and dividing the maximum by the number of indicators.

56. The computer readable medium of claim 50, wherein the indicators are grouped into two or more groups of indicators, and wherein determining the transition state for each indicator comprises determining the transition state for each group based upon the numbers of indicators in each group whose state changed or did not change during each of the plurality of time slices.

57. The computer readable medium of claim 50, wherein determining a transition state for each indicator comprises adjusting a first time slice to account for potential delays in determining states of each indicator.

58. The computer readable medium of claim 57, wherein adjusting the first time slice to account for potential delays comprises:

determining which indicator, if any, changed state last in time during the first time slice;

determining whether any other indicators changed state during a predefined period preceding the time of last indicator state change; and considering such other indicators whose state changed during the predefined period as having occurred during the first time slice.

59. The computer readable medium of claim 50, comprising storing a transition relevance factor in association with each indicator representing whether the indicator is relevant, and wherein determining a transition state for each indicator comprises determining transition state changes only for relevant indicators.

* * * * *